United States Patent [19]

Burgess, Jr.

[11] 4,305,175
[45] Dec. 15, 1981

[54] SCRAPING TOOL

[76] Inventor: Freeman L. Burgess, Jr., 2190 Pinehurst Dr., East Point, Ga. 30344

[21] Appl. No.: 133,560

[22] Filed: Mar. 24, 1980

[51] Int. Cl.³ .............................................. A47L 1/16
[52] U.S. Cl. .................................... 15/236 R; 29/81 G
[58] Field of Search .................... 15/105, 111, 236 R; 29/81 G; 128/304

[56] References Cited

U.S. PATENT DOCUMENTS

| | | | |
|---|---|---|---|
| 2,236,093 | 3/1941 | Friend | 15/236 R X |
| 2,275,713 | 3/1942 | Ahlborg | 15/236 R X |
| 3,274,684 | 9/1966 | Marks | 15/236 R X |
| 3,566,430 | 3/1971 | Young | 15/236 R |
| 3,955,234 | 3/1976 | Roefaro | 15/236 R |

FOREIGN PATENT DOCUMENTS 2261033  6/1973  Fed. Rep. of Germany .... 15/236 R
596817  3/1978  Switzerland ...................... 15/236 R

*Primary Examiner*—Chris K. Moore
*Attorney, Agent, or Firm*—Jones, Thomas & Askew

[57] ABSTRACT

An improved scraping tool particularly suited for scraping ice from an automobile windshield is formed from a shell member 10 having two pairs of blades (20, 21) disposed longitudinally along the shell. One blade (21) from each pair is straight and disposed transversely across the shell (10) while the other blade (20) from each pair is arcuate in shape and spaced apart from the first blade at the center portions and joined at the distal ends (48, 48').

6 Claims, 7 Drawing Figures

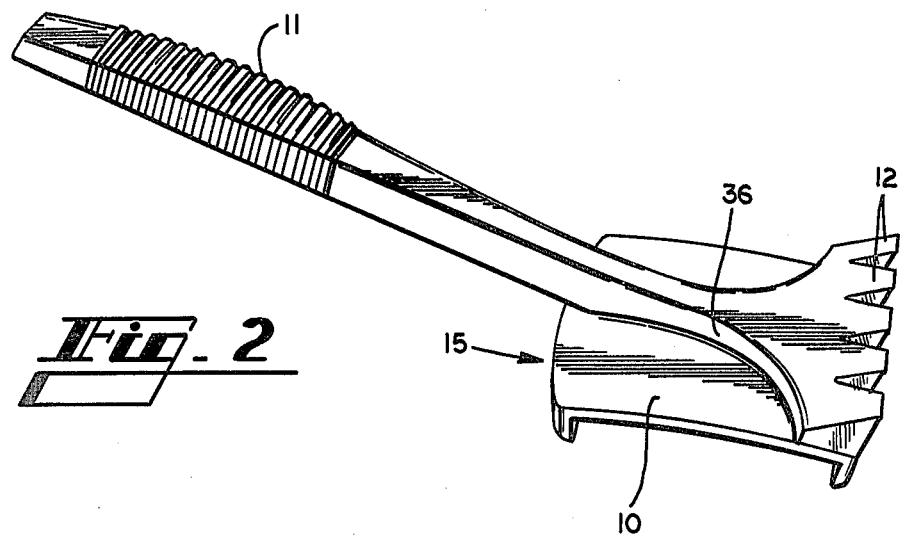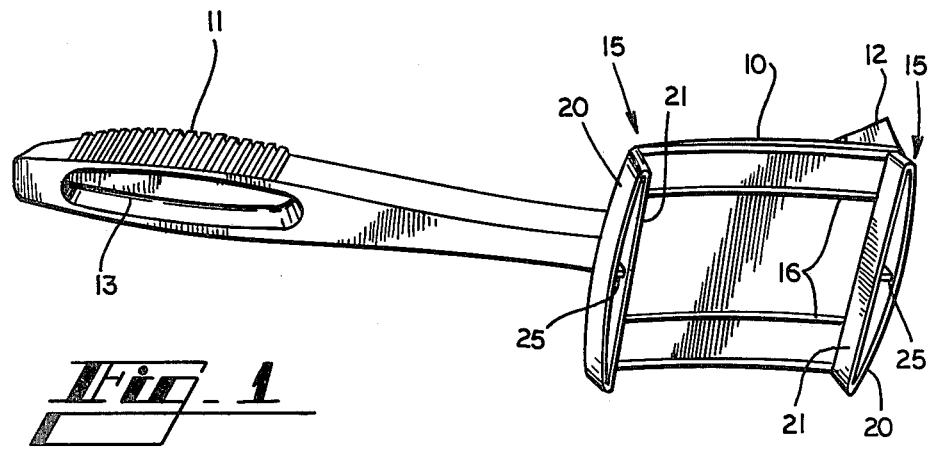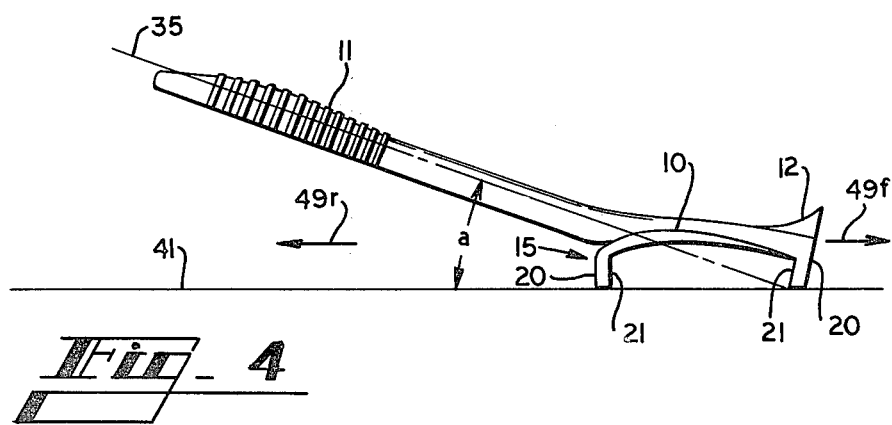

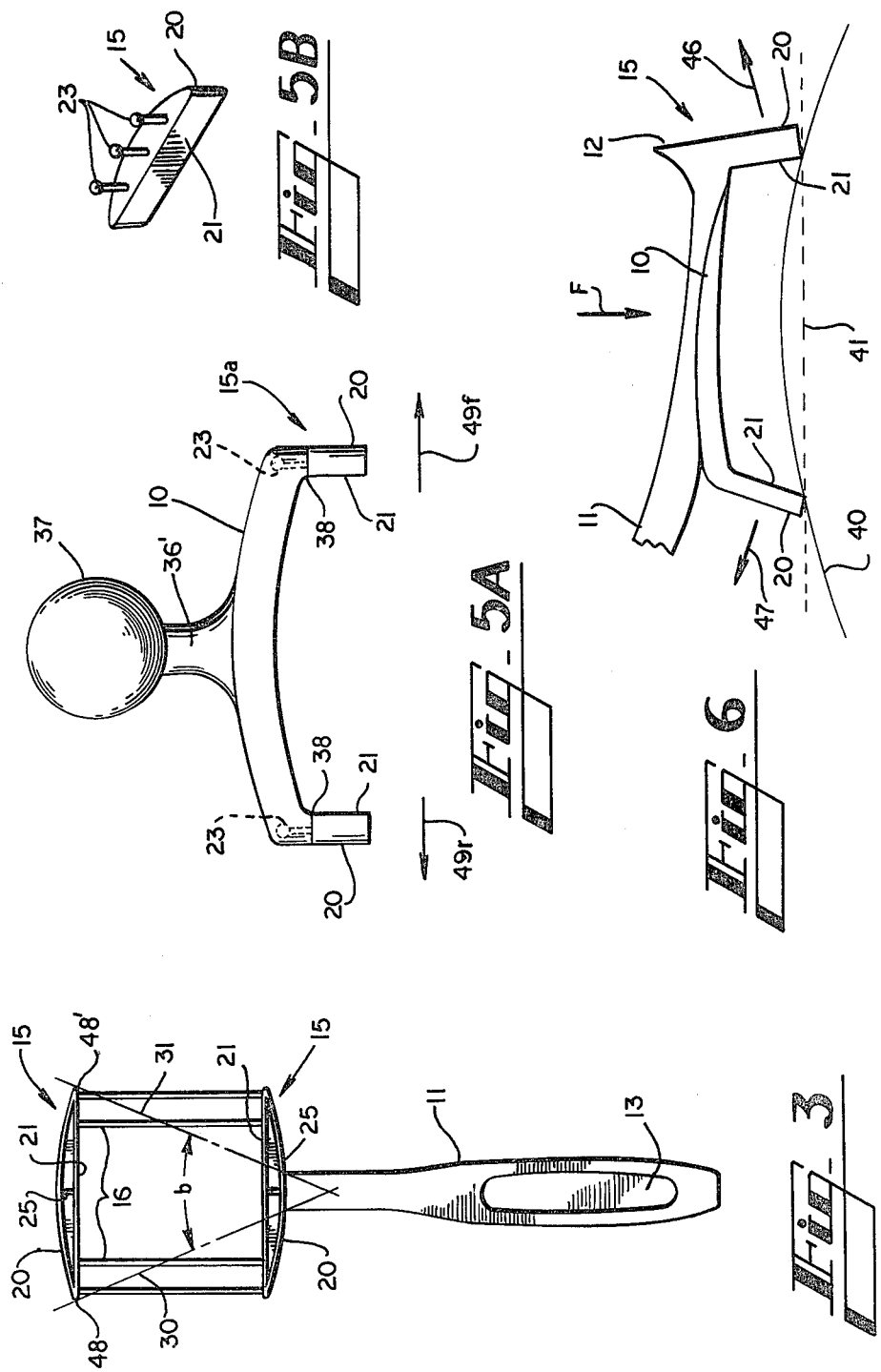

SCRAPING TOOL

TECHNICAL FIELD

The present invention relates to hand tools for scraping and particularly to a tool adapted for scraping ice from a planar surface or a surface having a slight curvature such as an automobile windshield.

BACKGROUND OF THE INVENTION

The proliferation of the automobile in densely populated urban areas has caused the owners of many automobiles to store their vehicles outside where they are exposed to the elements. During the winter months it is quite common for thick deposits of ice to form on the window areas of automobile including the windshield.

It is thus a part of the common experience of many automobile owners to be forced to remove ice from the windshields of their automobiles prior to operating same during the winter months.

While a variety of methods for removing ice are available icluding the use of hot water and applied chemicals to aid in the removal of ice, the most common method remains the use of a hand operated scraping tool, usually formed of plastic, to forceably scrape the ice from the windshield surface.

The most common form of such a scraping tool is an injection molded plastic tool having a form quite similar to a large putty knife. The user of such a tool must select the angle of attack at which the blade encounters the surface and, as will be known to those familiar with the use of such scrapers, bruised and skinned knuckles often result when the blade ceases to attack the point where the bottom of the ice contacts the windshield proper and the blade skids over the remaining ice surface.

The main drawback in the use of chemical solvents or warm water is that the solvents generally take a relatively long time in which to act on the ice and the warm water quickly becomes cold water and may lead to the formation of new deposits of ice.

The net result of prior art apparatus and methods for removing ice from the windshield of automobiles is to delay the time in which the operator may operate the automobile and to injure the hands of the operator.

It is therefore desirable to provide an improved scraping tool, particularly adapted for the scraping of ice from automobile windshields, which may be easily and inexpensively produced and which will avoid the problems encountered with prior art ice scraping devices.

SUMMARY OF THE INVENTION

The present invention overcomes the drawbacks of previous scraping tools, particularly ice scraping tools, by providing a plurality of blade edges which define a scraping plane that will contact the interface between ice and windshield.

The present invention comprises a shell member for carrying a plurality of scraping members, each of the scraping members comprising a pair of blades which are spaced apart in the middle and joined together at the ends. The scraping members are spaced longitudinally along the shell members and the blades of each scraping member run generally transverse across the shell member. The plurality of blade edges which are to contact the surface being scraped form a scraping plane. In the present invention, the shell member is provided with suitable means for attaching a handle by which the user may grasp the tool.

A preferred form of the present invention includes a handle extending from the shell member having longitudinal axis which forms an acute angle with the scraping plane defined by the blades. It is preferred that the user grip the elongated handle in one hand and the preferred form of the present invention allows the user to place the heel of his or her other hand on top of the shell member in order to appropriate apply pressure to the scraping members.

An alternate embodiment is also shown herein wherein a handle is provided directly on top of the shell member so that the present invention may be advantageously used with only one hand.

In a preferred form of the present invention, each of the scraping members comprises a pair of blades wherein a first one of the blades defines an arc of a circle, with the accompanying blade of the pair defining a chord subtended by the arc of the first blade. It has been found by the inventor that such an arrangement provides an unexpected improvement in the scraping capabilities of the tool. It is preferred but not essential that all of the straight blades in the plurality of scraping members be parallel to each other.

It will therefore be appreciated that the present invention provides a scraping tool having a plurality of blade edges which can simultaneously contact the surface being scraped.

It is also preferred in the present invention to have a slightly arcuate shape to the shell member and to construct the shell member from an elastic material such as a heavy plastic so that the scraping members will become somewhat splayed when pressure is applied to the top of the shell member in a direction perpendicular to the surface being scraped.

It is a further object of the present invention to provide an improved scraping tool having a scraping plane which may be placed on the surface being scraped in such a manner that the user is not likely to injure his or her hands during the use thereof.

It is still a further object of the present invention to provide a scraping tool with greatly improved scraping characteristics which may still be manufactured of a unitary construction of injection molded plastic so that such a tool may be price competitive with the prior art scraping tools.

It is still a further object of the present invention to provide an improved scraping tool wherein all of the tool, save the scraping members, may be constructed of a unitary piece of injection molded plastic and which will provide a means for accepting replaceable blades of a more durable material without significantly increasing the cost of the tool.

It is still a further object of the present invention to provide an improved scraping tool having a curvature on the leading edge of the scraping members.

It is yet a further object of the present invention to provide an improved scraping tool which is equally effective in scraping planar surfaces or surfaces having a curvature such as automobile windshields.

It is also an object of the present invention to provide an improved scraping tool which will provide a scraping action when moved in either one of two directions over the surface to be scraped.

These and other objects of the presnt invention will become apparent from the detailed description of the embodiments below.

BRIEF DESCRIPTION OF THE DRAWINGS

FIG. 1 is a pictorial view of the first preferred embodiment of the present invention showing the underside of said embodiment.

FIG. 2 is a pictorial view showing the top of the first preferred embodiment of the present invention.

FIG. 3 is a plan view of the bottom of the first preferred embodiment of the present invention.

FIG. 4 is a side elevational view of the first preferred embodiment of the present inventon.

FIG. 5A is a side elevational view of a second preferred embodiment of the present invention.

FIG. 5B is a pictorial view of a removable scraping member of the second preferred embodiment.

FIG. 6 is a side elevational view showing the flexing of the preferred embodiment of the present invention in use.

DETAILED DESCRIPTION

Turning now to the figures in which like numerals denote like parts, the preferred embodiments of the present invention may be seen.

Turning first to FIG. 1, a pictorial view of the first preferred embodiment of the present invention may be seen wherein the bottom of the first preferred embodiment is visible. As may be seen in FIG. 1, the first preferred embodiment comprises a shell member 10 having a handle 11 attached thereto. The underside of shell member 10 is strengthened by a plurality of ribs 16 which run longitudinally along the inner surface of shell member 10. Attached to the bottom of shell member 10 are a pair of scraping members 15. Each of scraping members 15 in the first preferred embodiment are formed by a pair of blade members 20 and 21. As may be seen from FIG. 1, blade members 20 are arcuate in shape and form a segment of arc length. The remaining blade members 21 of each of scraping members 15 are straight and have a scraping edge which defines a chord subtended by the arc segment of curved blade 20. It will be appreciated that the scraping edges of blade members 20 and 21 may be constructed so as to have any desired degree of sharpness.

As may also be seen from FIG. 1 is preferred to have portion of handle 11 hollowed out (shown as 13) in order to conserve the material from which an embodiment of the present invention is constructed.

FIG. 2 is a pictorial view showing the top of the first preferred embodiment of the present invention. As may be seen in FIG. 2, shell member 10 has a handle 11 attached thereto at a connecting point 36. In the first preferred embodiment, handle 11 and shell member 10 together with the remaining portions of the tool are constructed of a unitary piece of molded plastic. However it will be appreciated that connecting point 36 comprises a means for attaching a handle to top of shell member 10.

The preferred form of the present invention includes a plurality of studs 12 disposed along the front edge of the top of shell member 10. It will be appreciated by those skilled in the art of scraping tools that studs 12 provide apparatus for breaking up very thick and heavy portions of ice which may form on a surface such as an automobile windshield. The remaining finer scraping may then be done by use of the other portions of the tool.

Turning now to FIG. 3, a plan view of the bottom of the first preferred embodiment of the present invention may be seen. Therein the features heretofore described including the bottom of shell member 10 and strengthening ribs 16 are shown. Also shown in FIG. 3 are a pair of support members 25 between arcuate blades 20 and straight blades 21 of scraping members 15. The lower edge of support members 25 are preferably recessed so that they are above the scraping plane defined by the bottom edges of blades 20 and 21.

As in FIG. 3, the more forward arcuate blade 20 of the first preferred embodiment is shown to be a segment of arc of a circle having a subtended angle b between lines 30 and 31. In the preferred embodiment of the present invention, subtended angle b is equal to approximately 45°. It has been found the best mode of the present invention is practiced when the angle b subtended by arcuate blade 20 is in the range from 30°-50°. It has also be found that it is preferable to have the inner blades 21 straight as shown in FIG. 3 and to have these straight blades parallel to each other.

It will be appreciated from the drawings and particularly FIG. 3 that the first preferred embodiment comprises a shell member 10 having a pair of scraping members 15 disposed longitudinally along the shell with each of scraping members 15 comprising a pair of spaced apart blades 20 and 21 joined at the distal ends 48 and 48' thereof.

It will also be appreciated that the more rearward scraping member 15 is symmetrical with the more forward scraping member 15.

Turning now to FIG. 4, a side elevational view of the first preferred embodiment may be seen. As noted above, the first preferred embodiment includes an elongated handle 11 characterized by a longitudinal axis 35.

As may also be seen from FIG. 4, the scraping edges of blades 20 and 21 of scraping members 15 define the scraping plane shown as line 41 in FIG. 4. It will be understood that the scraping plane 41 is the plane which will contact all blades of the first preferred embodiment is placed on a planar surface.

As may be seen from the elevational view of the FIG. 4, the longitudinal axis 35 of handle 11 forms an acute angle a with scraping plane 41. It has been found that embodiments of the present invention using an elongated handle such as handle 11 of the first preferred embodiment are best constructed when angle a between the longitudinal axis 35 of the elongated handle and the scraping plane 41 defined by blades 20 and 21 is in a range from 15°-45°. It is preferred to have angle a selected so that studs 12 may be easily applied to the surface being scraped when the tool is inverted.

The first preferred embodiment which is believed by the inventor to be the best mode of practicing the present invention with an elongated handle is constructed with angle a equal to approximately 20°. The inventor has found that such a disposition of handle 11 relative to shell member 10 produces surprisingly good results when the first preferred embodiment is used.

To use the first preferred embodiment, the user grasps handle 11 and moves the tool over the surface to be scraped alternately in the directions of arrows 49f and 49r. If necessary, the heel of the user's other hand may be placed on top of shell member 10 to apply force perpendicular to scraping plane 41.

Turning to FIGS. 5A and 5B, a second preferred embodiment of the present invention is shown. FIG. 5A is a side elevational view of the second preferred embodiment which includes a shell member 10 and knob-type handle 37. Handle 37 is attached to shell member 10 by means of a protruding member 36' which in the second preferred embodiment comprises a means for attaching a handle to the top of shell member 10. It will therefore be appreciated that the second preferred embodiment of the present invention shown in FIG. 5A may be used by grasping the tool with only one hand placed around knob-type handle 37 and alternately moving the tool over the surface to be scraped in the directions shown by arrows 49F and 49R.

In the second preferred embodiment, an additional feature of the present invention is shown. In FIG. 5A, lines 38 separate shell member 10 from scraping members 15a. Turning to FIG. 5B it may be seen that scraping members 15a of the second preferred embodiment are removable from shell member 10. From FIG. 5B it may be seen that removable scraping members 15a are provided with a plurality of snap-in locking posts 23 which are inserted into a appropriate receptacles shown in phantom in FIG. 5A. While posts 23 are preferred, any appropriate means for selectively attaching members 15 to shell 10 may be used. In the second preferred embodiment, it will be appreciated that removable scraping members 15a may be constructed of a more durable material than that required for shell member 10 and remaining portions of an embodiment of the present invention.

It will also be apparent to those skilled in the art that the removable shell members as shown for the second preferred embodiment may also easily be provided for the first preferred embodiment shown in FIGS. 1-4.

Turning now to FIG. 6, one of the novel features of the present invention which the inventor believes to be particularly advantageous is shown. In FIG. 6, the splaying of scraping members 15 in response to a force applied to the top of shell member 10 perpendicular to the scraping plane is shown. In FIG. 6 the displacements involved are exaggerated for the sake of clarity. It is assumed that a force in the direction shown by arrow F is applied. As mentioned hereinbefore, such force could be supplied by the heel of the hand of the user or from downward force applied to elongated handle 11 of the first preferred embodiment. Alternately the force may be applied by placing pressure directly downward on knob-type handle 37 of the second preferred embodiment.

A curved surface 40 to be scraped is also shown with the curvature slightly exaggerated over that often encountered on commercially available automobile windshields. Also shown in FIG. 6 as dashed line 41, is the normal scraping plane define by blades 20 and 21 in the absence of the force in direction F.

It is to be recalled that it is preferred to construct shell member 10 of an elastic material which will bend under torsional forces such as those applied in direction F as shown in FIG. 6. It will therefore be appreciated that scraping members 15 will be splayed upward and outward generally in the directions shown by arrows 46 and 47 in FIG. 6. It will therefore be appreciated that blades 21 have a slightly different angle of attack under these conditions than in the absence of a force in direction F. It is the belief of the inventor that this splaying action wherein the blades 20 and 21 become "mashed" into the ice (not shown) to be scraped from surface 40 in response to forces applied perpendicular to surface 40 is a significant contributing factor to the unexpectedly good results received from actual use of an embodiment of the present invention.

It will also be appreciated that when the tool is moved alternately in directions 49f and 49r that blades 20 will form the leading edge which initially encounters the material to be scraped from the working surface. It has been found to be preferred and advantageous to have the arcuate shape on the leading edge encountering the ice or other material to be scraped and it is believed that this feature increases the overall strength and durability of scraping members 15.

It will be appreciated by those skilled in the art of scraping tools that the foregoing description of alternate preferred embodiments has been by way of example only and that other embodiments of the present invention providing the improved results set forth hereinabove may be constructed within the scope of the claims below.

I claim:
1. A scraping tool comprising:
a shell member;
means for attaching a handle to the top of said shell member;
a pair of scraping members spaced longitudinally along the bottom of said shell member;
each of said scraping members comprising a pair of spaced apart blades extending generally transversely across said shell member, wherein said blades of said pair of blades are joined to each other at the distal ends thereof.
2. A tool as recited in claim 1 wherein:
said pair of spaced apart blades comprises an arcuate first blade defining a segment of arc and a straight second blade defining a subtended chord of said segment or arc.
3. A tool as recited in claim 2 wherein said straight second blade for one of said pair of scraping members is parallel to said straight second blade for the other of said pair of scraping members.
4. A tool as recited in claim 1 wherein:
said blades define a scraping plane, and further comprising a handle characterized by a longitudinal axis, said handle being connected to said means for attaching a handle to said shell member to form an acute angle greater than 15° and less than 45° between said longitudinal axis and said scraping plane.
5. A tool as recited in claim 2 wherein said segment of arc subtends an angle greater than 30° and less than 50°.
6. A tool as recited in claim 1 wherein said scraping members are selectively removable from said shell member.

* * * * *